United States Patent [19]

Kelly

[11] 4,218,981
[45] Aug. 26, 1980

[54] SEED PLANTER

[76] Inventor: Ralph B. Kelly, Rte. 2, Box 22, Catoosa, Okla. 74015

[21] Appl. No.: 911,886

[22] Filed: Jun. 2, 1978

[51] Int. Cl.² ............................................. A01C 5/00
[52] U.S. Cl. ........................................ 111/89; 111/92
[58] Field of Search ................... 111/1, 89, 90, 91, 92, 111/93, 94, 95

[56] References Cited

U.S. PATENT DOCUMENTS

| 128,384 | 6/1872 | Gibbs | 111/92 X |
|---|---|---|---|
| 419,928 | 1/1890 | Claiborne et al. | 111/95 |
| 693,716 | 2/1902 | Jervis | 111/92 |
| 1,078,165 | 11/1913 | Priset | 111/92 |
| 1,298,134 | 3/1919 | Wilson | 111/92 |
| 1,439,601 | 12/1922 | Boop | 111/92 |
| 2,171,037 | 8/1939 | Mahurin | 111/92 |
| 2,690,145 | 9/1954 | Romain | 111/91 |
| 2,865,315 | 12/1958 | Goldstein | 111/92 |
| 4,074,461 | 2/1978 | Hirschman | 47/47 X |

FOREIGN PATENT DOCUMENTS 14223 of 1911 United Kingdom ..................... 111/1

*Primary Examiner*—Edgar S. Burr
*Assistant Examiner*—James R. Feyrer
*Attorney, Agent, or Firm*—Head & Johnson

[57] ABSTRACT

A seed planter comprising an elongated tube member having a seed hopper at one end in open communication with the interior of the tube member, a discharge opening provided at the opposite end of the tube for release of seeds therefrom, a seed reservoir in the proximity of the hopper for storing a seed supply therein, and an adjustable gauge disposed at the discharge end of the tube for facilitating spacing of the seeds during a planting operation.

1 Claim, 4 Drawing Figures

SEED PLANTER

BACKGROUND OF THE INVENTION

1. Field of the Invention

This invention relates to improvements in planting devices and more particularly, but not by way of limitation, to a seed planter for planting of seeds from a standing position and in spaced relation in a furrow.

2. Description of the Prior Art

In the planting of seeds, particularly in the smaller home gardens and the like, it is the usual practice to prepare a furrow for receiving the seeds, then stoop or kneel in the proximity of the furrow for dropping the seeds from the hand into the furrow, and subsequently manually cover the seeds with soil. It often becomes difficult for some persons to do the usual stooping required for the planting of the seeds along the furrow. For example, handicapped persons, older persons, and the like, often find it difficult to stoop or kneel on the ground as necessary for the planting operation. In addition, it is frequently desirable to space the seeds a selected distance apart in the furrow throughout the length of the furrow to assure a more accurate or efficient planting of the seeds for a more productive yield. This preselected spacing is difficult to attain with any degree of regularity when manually dropping the seeds into the furrow. Furthermore, the hand planting of seeds, or the use of present day mechanical type seed planters, frequently results in the loss of many seeds.

SUMMARY OF THE INVENTION

The present invention contemplates a novel seed planter particularly designed and constructed for overcoming the foregoing disadvantages. The novel planter comprises an elongated tube member having the opposite ends thereof open. A hopper member is provided at one end of the tube member in open communication with the interior thereof for receiving seeds and directing the seeds into the tube. The seeds fall through the tube by gravity, and are discharged from the opposite end thereof for disposition within the furrow wherein they are to be planted. A suitable container is preferably provided in the proximity of the hopper member for storing a supply of the seeds therein, and an adjustable gauge member is provided in the proximity of the discharge end of the tube member in order to facilitate the planting of the seeds at a predetermined spacing with respect to one another in the furrow. It is preferable to provide a suitable handle for the tube member for facilitating holding of the device during a planting operation whereby the user of the device may plant seeds in a predetermined spaced relation in the furrow without the necessity of stooping or squating during the planting operation. The user of the device may retain in an erect or standing position during the entire planting operation, and the complete planting operation may be accomplished in a minimum of time. The resulting rows of plants yielded by the seeds will be substantially straight with the plants therein substantially evenly spaced for improving the visual aspects of the garden as well as the efficient yield of the planted seeds. The novel device is constructed of a lightweight, tough plastic material and is designed for ease of shipment and storage when not in use. The device is simple and efficient in operation and economical and durable in construction.

DESCRIPTION OF THE PREFERRED EMBODIMENT

Figure 3:
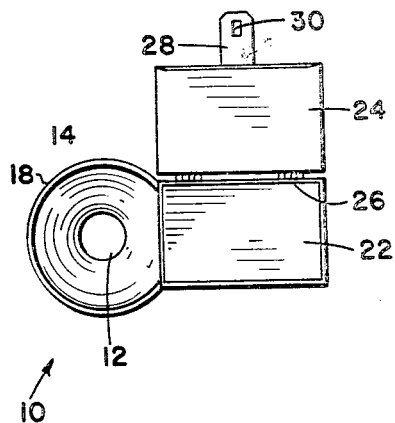
FIG. 3 is a top view of a seed planter embodying the invention, with the seed reservoir container shown in an open position for purposes of illustration.

Referring to the drawings in detail, reference character 10 generally indicates a seed planter comprising a tube member 12 preferably constructed from a lightweight, tough, non-breakable plastic material, but not limited thereto, and having a central passageway 14 extending longitudinally therethrough. The passageway 14 is open at the opposite ends thereof, ans whereas the tube 12 may be a single or unitary element if desired, it is preferable that the tube comprise a pair of tubes 12A and 12B disposed in end to end relation and removably secured together by a suitable collar 16, or the like, in order to facilitate disassembly of the device 10 for shipment and storage, as will be hereinafter set forth in detail.

A hopper or funnel member 18 is removably or otherwise secured to one end of the tube 12 in any suitable manner (not shown) and is in open communication with the passageway 14, as particularly shown in FIG. 3. The funnel-shaped configuration of the hopper 18 assures that seeds (not shown) placed within the hopper will be directed into the open end of the passageway 14 and will fall freely through the passageway 14 for discharge through the open outer end 20 of the tube 12. A container 22 is disposed in the proximity of the open end of the hopper 18, and is preferably molded or otherwise constructed integrally therewith, but not limited thereto. In the event the container 22 is a separate element with respect to the hopper 18, it may be desirable to provide a support member (not shown) extending between the outer periphery of the tube 12 and the outer periphery, or bottom of the container 22. However, when the container 12 is molded integrally with the hopper 18 the support member may be eliminated. The container 22 provides a reservoir for storing a supply of seeds (not shown) to be planted by the device 10 and may be of any suitable or desired overall configuration. As shown herein the container is configured in the manner of a substantially rectangular box, and is provided with a cover or lid member 24 hingedly secured to the open upper end thereof as shown at 26 in order that the lid 24 may be alternately opend and closed with respect to the open end of the container 22. It is preferable to provide a suitable latching mechanism for maintaining the lid 24 in the closed position. The latch mechanism as shown herein comprises a tongue member 28 hingedly secured to one edge of the lid member 24, and having an aperture 30 provided therein for receiving an eye member 32 therethrough in the latch position of the lid 24 with respect to the container 22. The eye member 32 is secured to the outer periphery of the container 32 and so positioned as to readily enter the aperture 30 when the lid 24 is in the closed position and the tongue member 28 is pivoted into a position substantially adjacent the outer wall of the container, as particularly shown in FIG. 1. A pivotal latch member 34 is suitably secured to the outer face of the tongue 28 for engagement with the eye 32 when the tongue is in the closed or latched position, thus securely retaining the lid 24 in a closed position against the open end of the container 22. Of course, it will be readily apparent that substantially any latching means may be utilized in lieu of the latch mechanism shown herein. For example, complementary detent means may be provided on the outer periphery of the container 22 and on the mating portion of the lid 24 whereby the detent means snaps together when the lid 24 is in the closed position. This type latching means may be preferable in that it is inexpensive, and facilitates storage of the device 10 in a minimum spaced during shipment, or the like.

Figure 1:
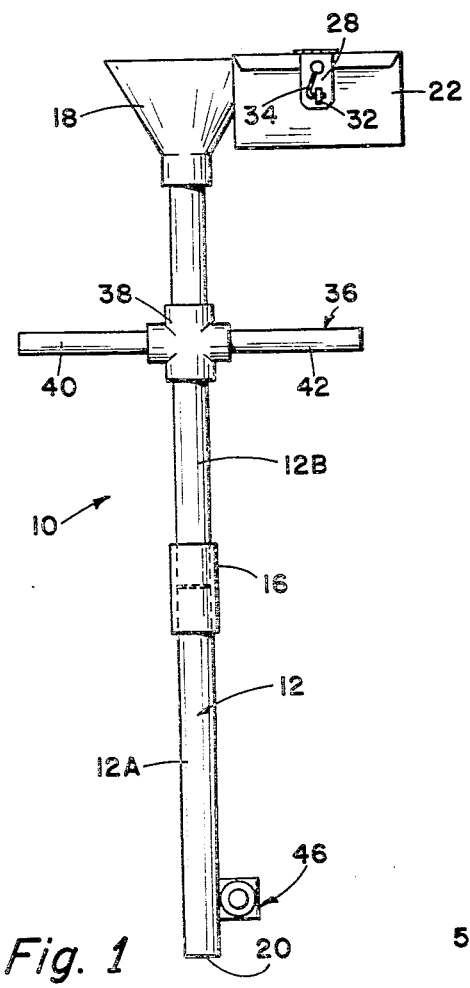
FIG. 1 is a side elevational view of a seed planter embodying the invention.

A suitable handle 36 is provided for the device 10 for facilitating the use thereof an erect or upright position of the user thereof. The handle 36 as shown in FIG. 1 comprises a suitable cross fitting 38 secured to the outer periphery of the tube 12 in any well known or suitable manner (not shown) and disposed at a convenient location thereon for facilitating manipulation of the device 10 during a planting operation, as will be hereinafter set forth. A pair of oppositely disposed outwardly extending rods 40 and 42 are secured to the cross 38 in any suitable manner to provide handles for manual grasping during manipulation of the device 10. Alternatively, a single rod 44 (FIG. 4) may be suitably secured to the rod 12 and extends radially outwardly therefrom in one direction to provide a handle for the device 10.

Figure 2:
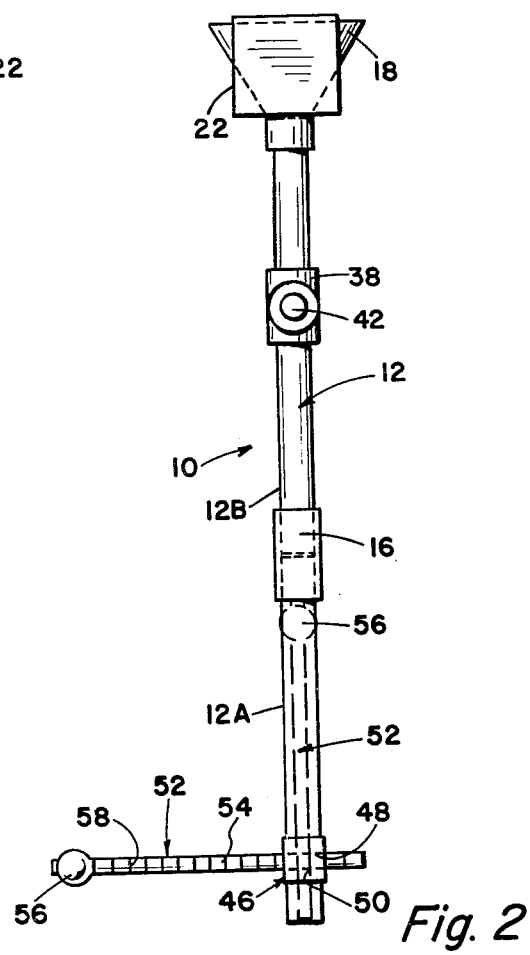
FIG. 2 is a front elevational view of a seed planter embodying the invention.

As hereinbefore set forth, the end 20 of the rod 12 is open for discharging seeds therethrough. In addition, a suitable fitting member 46 is rigidly secured to the outer periphery of the tube 12 in the proximity of the end 20 thereof and is provided with a first passageway 48 extending therethrough in a direction substantially perpendicular to the axis of the tube 12. A second passageway 50 extends through the fitting 46 and is substantially perpendicular to the first passageway 48. A guage member generally indicated at 52 is removably carried by the fitting 48, and comprises a shank member 54 of a cross-sectional configuration and size complementary to the passageways 48 and 50 for slidable engagement therewith. A ball 56, or the like, is secured to one end of the shank 54 and is preferably rigidly secured thereto. A suitable linear gauge 58 is suitably inscribed along the length of the shank 54 and is preferably scaled in linear dimensions, such as inches, centimeters, or the like. When the gauge 52 is in an operating position, the shank 54 is inserted through the first passageway 48, as shown in solid lines in FIG. 2, and when the gauge 52 is in a storage position, such as during shipment or the like, the shank 54 is disposed in the second passageway 50 and lies substantially parallel to the rod 12 as shown in broken lines in FIG. 2. Whereas the shank 54 is slidable with respect to both passageways 48 and 50, it is preferable that the fit therebetween be sufficiently tight as to provide sufficient friction for retaining the gauge 52 in the preselected position in the passageway until it is desired to manually alter the position of the gauge for a purpose as will be hereinafter set forth. Of course, a set screw or the like (not shown) may be provided, if desired, for engagement with the outer periphery of the shank 54 to retain the shank in the preselected position therefor in either the passageway 48 or 50.

During a planting operation, it is the usual practice to initially prepare the ground 60 for receiving seeds. For example, when the earth has been properly broken up, it is common practice to drive stakes (not shown) at each end of a row wherein it is desired to plant seeds. It is desirable to stretch a string (not shown) between the stakes, and to make a furrow 62 along the line defined by the string with the use of a hoe or the like. The furrow is now ready for receiving seeds therein, and a planting operation may begin.

In use of the device 10, a supply of seeds to be planted may be deposited within the reservoir or container 22. The gauge 52 is positioned in the operating position thereof as shown in solid lines in FIG. 2, and the position of the shank 54 within the passageway 48 is manually adjusted in such a manner that the ball 56 is disposed at a predetermined distance from the open end 20 of the tube 12, said distance being the distance desired between planted seeds. This may be accomplished by aligning the measuring gauge indicia 58 with the side of the fitting 46 to achieve the proper distance between the tube 12 and the ball 56.

Figure 4:
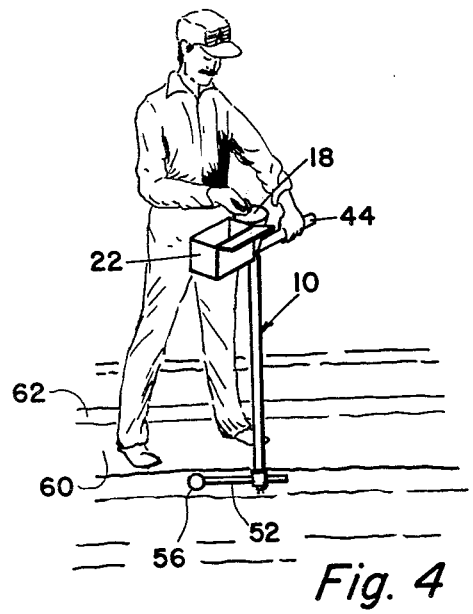
FIG. 4 is perspective view of a seed planter embodying the invention as in use during a planting operation.

The planting operation may be started from either end of the furrow 62. The open end 20 of the tube 12 is positioned in substantial alignment with the furrow, as shown in FIG. 4, and a few seeds, such as one or two seeds in the case of relatively large seeds, may be manually dropped into the hopper 18, whereupon the seeds will be directed into the passageway 14, and drop or fall therethrough by gravity for discharge into the furrow 62 through the open end 20. The device 10 may be manually moved into a position wherein the ball 56 is disposed on the seeds just planted. More seeds may then be dropped into the funnel 18 for discharge into the furrow 62 as hereinbefore set forth, and the operation may be repeated until the entire row has been planted with seeds spaced apart at substantially the exact preselected distance therebetween. When the planting of the furrow has thus been completed, the dirt may be pulled into the furrow in the usual manner for covering the seeds, and tamped down as is well known.

It will be readily apparent that the seed planting operation may be accomplished from an erect or standing position of the user of the device 10, and the substantially identical spacing between the seeds will result in a beautiful garden as the seeds grow. In addition, there will be substantially no waste of seed during a planting operation utilizing the device 10. Of course, substantially any size seed, from beans and corn to lettuce, may be efficiently planted with the device 10. When using relatively small seeds, it may be desirable to pick up a pinch of seeds between the thumb and forefinger and deposite the pinch of seeds at one time in the funnel or hopper 18. When planting larger seeds, such as beans and corn, it is desirable to drop one or two seeds, only, at a time into the hopper 18.

When the device 10 is not in use, the tubes 12A and 12B may be removed from the collar 16, if desired, and positioned substantially parallel with respect to each other in order to provide a minimum area needed for storage (or shipping) of the device 10. In addition, the guage 52 may be removed from engagement with the passageway 48 and engaged with the passageway 50 whereby the gauge will be disposed substantially parallel with the tube section for further facilitating storage and/or shipment of the device 10.

From the foregoing it will be apparent that the present invention provides a novel seed planter particularly designed and constructed for eliminating stooping or squating during a seed planting operation. The device is preferably constructed from a lightweight plastic material which provides an economy of construction and shipment. The device comprises an elongated tube open at both ends and having a seed hopper at one end for selectively receiving seeds therein and directing the seeds through the tube for discharge into the furrow. An adjustable gauge is provided at the opposite end of the tube for facilitating spacing of seeds in the furrow at uniform spacings therebetween for improving the results of the planting operation. The elongated tube is preferably sectional for ease of packaging the device for shipment, and is designed in a manner for substantial elimination of hardware elements. A covered reservoir is provided for reducing accidental loss of seeds during a planting operation, and substantially any size seed may be efficiently planted with the device.

Whereas the present invention has been described in particular relation to the drawings attached hereto, it should be understood that other and further modifications, apart from those shown or suggested herein may be made within the spirit and scope of this invention.

What is claimed is:

1. A seed planter comprising elongated tube means having a passageway extending longitudinally therethrough and open at both ends, hopper means provided at one end of the tube means and in open communication with the passageway for receiving seeds therein and directing the seeds into the passageway by gravity, adjustable gauge means provided in the proximity of the opposite end of the tube means and operable for determining preselected distances from the tube means to facilitate planting seeds in spaced relation corresponding to said preselected distance, seed reservoir means disposed in the proximity of the hopper means for retaining a supply of seeds therein; said seed reservoir means comprising a container, a lid member hingedly secured to said container to provide alternate open and closed positions therefor, and latch means cooperating between the container and lid member for selectively closing the container for precluding accidental loss of seeds therefrom; said gauge means comprising a shank member removably carried by the tube means, ball means provided in the proximity of one end of the shank member, and dimensional indicia provided on said shank member for cooperating with the tube means to provide for preselected dimensional relationship between the position of the ball means and the tube means for facilitating the planting of the seeds with predetermined distances therebetween; and including fitting means secured to the tube means for removably securing the shank member thereto; said fitting means being provided with a first passageway extending therethrough for receiving the shank member therein and supporting the gauge means in a operating position during a planting operation, and a second passageway extending therethrough substantially perpendicular with respect to the first passageway for receiving the shank member therein and supporting the gauge means in a storage position; said tube means and hopper means being constructed of a lightweight tough plastic material; and said tube means is sectional for facilitating storage and shipment of the seed planter.

* * * * *